United States Patent [19]
Holehouse

[11] 3,910,374
[45] Oct. 7, 1975

[54] LOW FREQUENCY STRUCTURAL ACOUSTIC ATTENUATOR

[75] Inventor: Ian Holehouse, Bonita, Calif.

[73] Assignee: Rohr Industries, Inc., Chula Vista, Calif.

[22] Filed: Mar. 18, 1974

[21] Appl. No.: 452,364

[52] U.S. Cl. ............... 181/33 G; 161/68; 181/33 H
[51] Int. Cl. ............................................ B64d 33/06
[58] Field of Search ........... 181/33 G, 33 H, 33 HA, 181/33 HB, 42, 50; 161/68, 139

[56] References Cited
UNITED STATES PATENTS

| | | | |
|---|---|---|---|
| 2,870,857 | 1/1959 | Goldstein | 181/33 G UX |
| 3,353,626 | 11/1967 | Cremer et al. | 181/42 |
| 3,439,774 | 4/1969 | Callaway et al. | 181/33 G UX |
| 3,481,427 | 12/1969 | Dobbs et al. | 181/33 HA UX |
| 3,507,355 | 4/1970 | Lawson | 181/33 G UX |
| 3,542,152 | 11/1970 | Adamson et al. | 181/50 |
| 3,640,357 | 2/1972 | Kitching et al. | 181/33 G |
| 3,721,389 | 3/1973 | Mackinnon et al. | 181/33 HB X |

*Primary Examiner*—Richard B. Wilkinson
*Assistant Examiner*—John F. Gonzales
*Attorney, Agent, or Firm*—Patrick J. Schlesinger; Jay D. Gordon

[57] ABSTRACT

A sound attenuation honeycomb sandwich wherein each cell of a first layer acts as the neck of the resonator and each cell of the second layer acts as the cavity. The purpose of the first layer is to reduce the natural frequency of the resonator by increasing the length of the neck without using a solid, thick, sheet. The skins connected to the faying edges of the first layer are perforated to provide the necessary openings for the neck to function as the stiffness element in the resonator.

4 Claims, 1 Drawing Figure

LOW FREQUENCY STRUCTURAL ACOUSTIC ATTENUATOR

BACKGROUND OF THE INVENTION

The present invention relates to acoustical honeycomb material with particular application in the aerospace field.

It is common practice to employ honeycomb sandwich panels for a wide range of uses in the construction of aircraft space vehicles and other mechanisms and structures where light weight and strength is of importance. Such panels are also used for sound absorption, and when so used in the prior art, the core had a backing of thin sheet material applied to one end and a sound pervious facing of suitable material applied to the other end thereof. The core acts as a resonant chamber between the facing and the backing wherein sound waves passing through the sound pervious facing are broken down into waves of different, and usually higher, frequencies and wherein some of the energy is transformed into heat which is transferred to the ambient atmosphere.

In the prior art it had been common to fabricate a honeycomb sandwich wherein a backing layer of thin sheet material, such as aluminum or stainless steel, is mounted between two layers of honeycomb core material, and a foraminous facing of thin, sound pervious material is applied to the outer end of each layer of the core material. The assembly thus formed is then unified by suitable means such as an adhesive or by brazing.

The same general practice is followed in making a single core type panel wherein one surface only of the panel is to be used for sound absorption. In that case an imperforate backing layer is applied to one end of a layer of honeycomb material, and a thin, perforated, sound pervious facing is applied to the other end of the core material. With either the single or double core panels, the core material acts as a resonant chamber to change the wave length of some of the sound entering therein.

Various embodiments have been utilized to improve the performance of these devices. In one such embodiment the core material in specific zones is crushed. In other embodiments special materials such as graft polymers of methacrylic acid methyl ester are introduced to increase the attenuation capabilities of the sandwich.

The present invention goes beyond the prior art and is useful in increasing the sound absorptive qualities of the honeycomb sandwich. It may be used as an exclusive agent for this task, or in combination with one or more of the prior art devices.

The present invention utilizes, to some degree, the principle of the Helmholtz resonator. The dimensions of the various elements of an acoustic system are often small in comparison with the wavelength of the sound, and when this is true, the motion of the medium in the system is analogous to that of a mechanical system having lumped mechanical elements of mass, stiffness and resistance. The Helmholtz resonator consists of a rigid enclosure of volume V, communicating with the external medium through a small opening of radius $a$ and length $l$. The gas in the opening is considered to move as a unit and provides the mass element of the system. The pressure of the gas in the cavity changes as it is alternately compressed and expanded by the influx and efflux of gas through the opening and thus provides the stiffness element. At the opening, there is radiation of sound into the surrounding medium, which leads to the dissipation of acoustic energy and thus provides a resistance element. In addition, another resistance element is provided by the viscous forces associated with the influx and efflux of gas through the opening. The present invention extends the basic principal of this theory into a novel material combination that exhibits superior sound attenuation characteristics.

SUMMARY

An acoustic cellular honeycomb sandwich wherein two layers of honeycomb material are juxtaposed so that the orifices of the skins of the first layer register with the center of the cells of the second layer. The first layer comprises a thickness of honeycomb material enclosed on its faying edges by foraminous skins. One of those skins is attached on its other face to a second layer of honeycomb material, the cells of which are of greater dimension than the cells of the second layer. A solid, continuous skin encloses the second layer on the other faying edge.

The above described configuration is an adaptation of the Helmholtz resonator. The distance between the outer edges of the skins of the first layer are known as the neck of the system. Since in this environment the neck is composed of a honeycomb sandwich, there is an effective length of the neck which is the more significant quantity. That effective length $l$ is equal to $t + 16a/3\pi$.

In applying the Helmholtz resonator principle to low frequency sound attenuation, it is desirable to design the material such that the effective length of the neck is as large as possible. That is because the resonant frequency of the system is related to the effective length by the equation: $cx(S/l\ V)^{1/2}$, where S is the cross sectional area of the neck, or $\pi a^2$. From this relationship it should be evident that to decrease the resonant frequency an increase in the effective length is in order. This is preferred since an increase in the parameter U causes the second honeycomb layer to be too massive.

DETAILED DESCRIPTION

Figure 1:
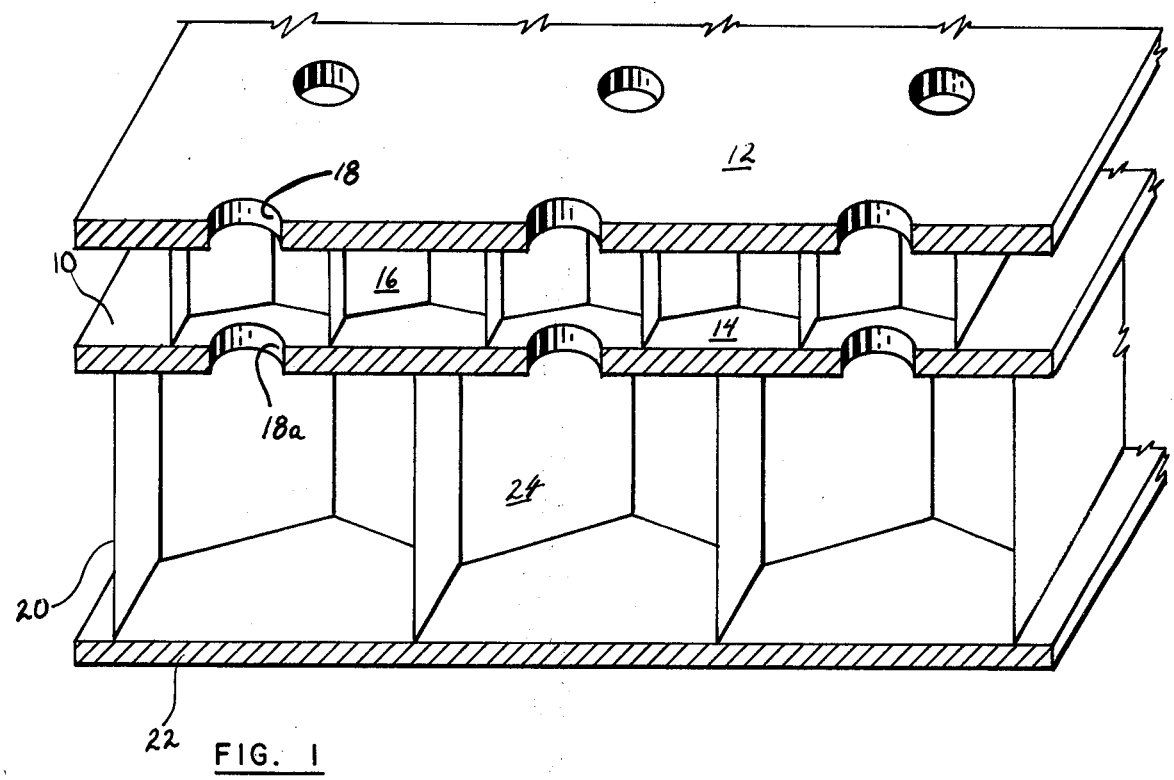
FIG. 1 is a perspective view of a portion of the material embodying the design of the present invention.

The material embodying the present invention is characterized by a first honeycomb layer 10 having top and bottom foraminous skins 12, 14. The skins may be fabricated from any suitable structural material and likewise the cellular matrix may be conventional. For reasons hereinafter described, the thickness of layer 10, including the skins 12, 14 shall be referred to as t and that dimension is appropriately chosen to correspond to the sound frequency for which damping is desirable. The cells 16 are all of similar size and the orifices 18, 18a are spaced centrally above and below each cell. For purposes of the following equations, the radius of an orifice will be referred to as "$a$".

According to Helmholtz resonator principles, there need be a cavity element for a properly functioning system. The second layer 20 is employed for this purpose. The upper faying edges of this honeycomb layer are bonded to the bottom face of skin 14. A continuous, solid skin 22 is bonded to the lower faying edges of the lower or main honeycomb layer 20.

The individual cells 24 of layer 20 have a volume V and the orifices 18a and their companion upper layer cells 16 are centrally spaced over those lower cells.

Now according to the principles of the Holmholtz resonator, by modifying the various parameters of the system, it is possible to adjust the resonant frequency of the combination to that desired. In particular, in high-speed aircraft, the frequency of the most damaging noise tends to be rather low. Therefore, low frequency sound attenuation is in order. The use of the first layer provides the system with a longer effective neck "$l$" which is related to the radius of the orifices and the thickness of that layer by the relationship $t + 16a/3\pi$. The resonant frequency of this attenuator can be expressed by the equation $w$ (frequency) $= c(S/lV)$ where $c$ is the speed of sound and $S$ the cross-sectional area of an orifice. The most desirable manner in which to decrease $w$ is to increase $l$. This is true since to accomplish this task by increasing V would result in a massive second layer which is of little use in aircraft applications. Thus, the utilization of a double ply honeycomb sandwich permits a direct application of the Helmholtz resonator principles. The aircraft engineer is now provided with a practical tool in which the sound attenuation properties may be designed into aircraft.

Many changes may be made in details of the instant invention, in the method and materials of fabrication, in the configuration and assemblage of the constituent elements, without departing from the spirit and scope of the appended claims, which changes are intended to be embraced therewithin:

I claim:

1. Acoustic cellular honeycomb sandwich which comprises a first sandwich layer of spaced cell honeycomb faced on the faying edges by foraminous skins, the orifices in each of said skins juxtaposed externally with respect to each of said honeycomb cells, a second layer of cellular honeycomb material the faying edges of one side thereof connected to one of said foraminous skins with the orifices of said one of said skins juxtaposed centrally with respect to said cells of said second layer, and said cells of said second layer being of greater width than the cells of said first layer.

2. The sandwich as recited in claim 1 wherein the effective acoustical neck length thereof is equal to the distance between the outer faces of said skins of said first layer plus the equivalent of 16 times the radius of said orifices divided by three times pi.

3. The sandwich of claim 1 wherein said second layer other faying edges are connected to a solid, continuous skin.

4. The sandwich of claim 2 wherein the resonant frequency of said acoustical sandwich is a function of the speed of sound times the square root of pi times the radius of the orifices squared divided by the effective length of the neck times the volume of a cell of the second layer.

* * * * *